Feb. 18, 1969   P. J. IMSE   3,428,373
CONVEYOR ROLL ASSEMBLY WITH REMOVABLE SHAFT BEARING RETAINER
Filed Aug. 17, 1966

INVENTOR
PHILIP J. IMSE
BY Sughrue, Rothwell, Mion, Zinn & Macpeak
ATTORNEYS

United States Patent Office 3,428,373
Patented Feb. 18, 1969

3,428,373
CONVEYOR ROLL ASSEMBLY WITH REMOVABLE SHAFT BEARING RETAINER
Philip J. Imse, Wauwatosa, Wis., assignor to Rex Chainbelt Inc., Milwaukee, Wis., a corporation of Wisconsin
Filed Aug. 17, 1966, Ser. No. 572,942
U.S. Cl. 308—20                                    3 Claims
Int. Cl. F16c 13/00, 35/00; B23p 19/00

ABSTRACT OF THE DISCLOSURE

A removable shaft bearing retainer for a conveyor roll frictionally engaged within the conveyor roll housing having a retainer sleeve with externally threaded portions designed to cooperate with a removing tool. The tool comprises an elongated hollow tubular member having external threads arranged along one end thereof. The tool fits within the retainer sleeve and over a central support shaft so as to engage the external and internal sets of threads causing the threaded end of the tool to abut the bearing supported on the shaft thereby forcing the retainer sleeve off the shaft and out of the conveyor housing due to rotation of the threadedly engaged tool relative to the retainer sleeve.

---

Figure 1:
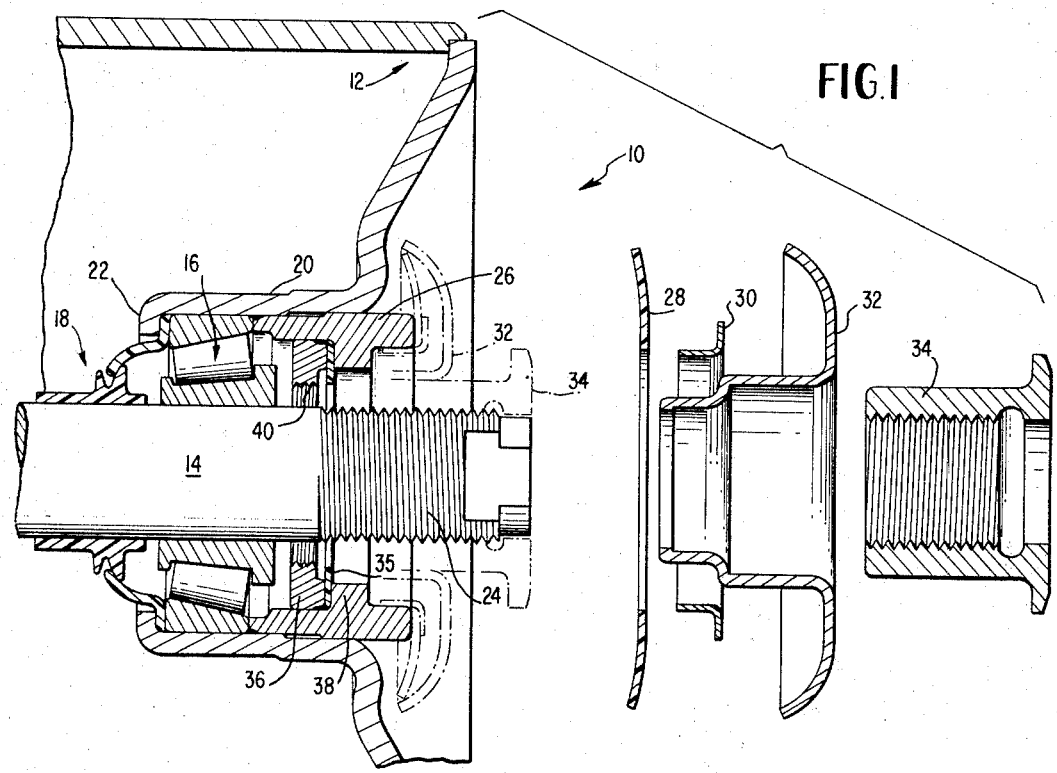

This invention relates to improvements in conveyor roll assemblies and particularly to a removable shaft bearing retainer therefor.

The use of threaded tools as sleeve pullers of various types and configurations is known in the prior art. However, in a conveyor roll assembly of the type where a roll is rotatably mounted on a bearing which in turn is supported on a stationary shaft and in which the shaft has an extension beyond the bearing, the application of conventional tools for removing a retaining sleeve for the bearing presents difficulties. According to this invention a retaining sleeve may be removed by providing the sleeve with an inner threaded edge surrounding the shaft and a tubular member having threads mating with the threads on the inner threaded edge of the sleeve is positioned over the shaft and threaded therein. When the tubular member abuts against the bottom of a cavity, which in the particular construction is a bearing, reaction forces will be directed outwardly along the threaded engagement forcing the retaining sleeve outwardly. Thus a simple tubular tool may be used as a sleeve puller when the sleeve is internally threaded to mate with the puller, or when an extractor nut is carried by the sleeve so as to move the sleeve outwardly when outward forces are directed to the nut.

Other features of the invention will be pointed out in the following description and claims and illustrated in the accompanying drawing, which disclose by way of example, the principle of the invention and the best mode which has been contemplated of applying that principle.

Figure 2:
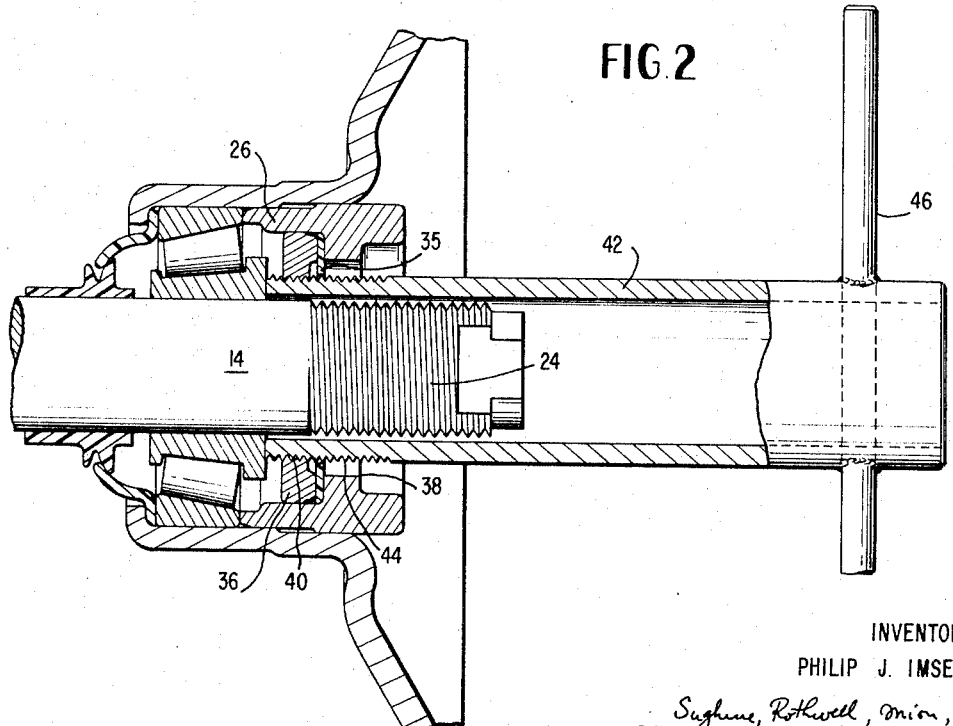

In the drawing:

FIG. 1 is an exploded partial sectional view taken longitudinally through a conveyor roll assembly showing the rotatable mounting thereof and a seal assembly therefor with certain portions of the seal removed; and FIG. 2 is a sectional view showing the conveyor roll assembly as in FIG. 1 with a pulling tool applied to pull a bearing retainer sleeve therefrom.

Referring to the drawing, a conveyor roll assembly 10 is of a type known in the art and includes a rotatable roll housing 12 rotatably mounted on stationary shaft 14 by means of tapered roller bearing 16. A seal assembly 18 may be provided to seal between bearing 16 and the inside of housing 12.

The roll housing 12 includes an in-turned bearing support surface 20 terminating with an inwardly extending flange 22 which retains a portion of seal assembly 18, supports bearing 16 and prevents the bearing from moving inwardly of the end of shaft 14.

The bearing 16 is prevented from moving outwardly on shaft 14 by a bearing retainer sleeve 26 which is press fitted within the bearing support surface 20 of roll housing 12. In order to remove bearing 16, bearing retainer 26 must first be pulled outwardly from its frictional engagement within bearing support surface 20.

The outer end of shaft 14 has a threaded portion 24 thereon. Surrounding this threaded portion in the usual construction of the conveyor roll assembly is an outer washer seal 28, a seal retainer 30 and a shield 32, held on to the shaft 14 by a nut 34 engaging threads 24 and normally positioned as shown in phantom lines in FIG. 1. However, in the operation of removing bearing retainer sleeve 26 the component shown in phantom lines in FIG. 1 are first removed.

An inner washer seal 35 is carried by bearing retainer sleeve 26 and specifically by extractor nut 36 which is press fitted within the retainer sleeve 26 inwardly of a shoulder 38 therein. The extractor nut 36 includes internal threads 40 for the purpose of pulling the retainer 26.

A tubular tool 42 such as a hollow pipe having an inner diameter larger than shaft 14 has on its outer periphery threads 44 to mate with threads 40 on extractor nut 36. The tool 42 may also be provided with a handle 46.

In operation, in order to remove bearing 16, retainer sleeve 26 must first be pulled outwardly of its press fit within bearing support surface 20. In order to do this nut 34 is removed, as are shield 32, retainer 30 and seal 28. The tubular tool 42 is slipped over the threaded end 24 of shaft 14 and threaded into engagement with the extractor nut 36. Continual threading of tool 42 causes the end of it to abut against the outer end of bearing 16 as shown in FIG. 2 or against the bottom surface of any other similar cavity. Continued rotation after the end of tool 42 abuts against bearing 16 causes an opposite reaction force to be directed outwardly of shaft 14 causing extractor nut 36 to move to the right as viewed in the drawing, and since extractor nut 36 is bearing against shoulder 38 of retainer sleeve 26, it also moves to the right until it is free from its press fit within the bearing support surface 20. In this manner the retainer sleeve 26 can be quickly and easily removed.

While the invention has been particularly shown and described with reference to a preferred embodiment thereof, it will be understood by those skilled in the art that various changes in form and details may be made therein without departing from the spirit and scope of the invention.

What is claimed is:

1. A conveyor roll assembly with a removable shaft bearing retainer, the assembly comprising:
    (a) a shaft,
    (b) a bearing on the shaft inwardly of the end thereof,
    (c) a conveyor roll housing rotatably journaled on the bearing by a bearing support surface of the housing, the housing preventing bearing movement inwardly of the shaft end,
    (d) a bearing retainer sleeve frictionally held within the housing outwardly of the bearing on the shaft to retain the bearing against movement outwardly of the shaft, and
    (e) internal threads on the retainer sleeve, so that a hollow elongated tubular tool having external threads at one end only cooperating with the internal threads on the retainer sleeve and having an inside diameter greater than the shaft so as to allow the tool to fit over the shaft and be guided by the outer end of the shaft may be threaded into the sleeve until the end of the tool bears against the bearing and then continued engagement of the threads during rotation will cause removal of the frictionally held bearing sleeve.

2. A conveyor roll assembly as in claim 1 wherein the bearing retainer sleeve includes an elongated sleeve having an internal shoulder, extractor nut frictionally engaged therewith positioned on the side of the shoulder inwardly of the end of the shaft, the internal threads arranged on the extractor nut so as to cooperate with the external threads on the tubular tool.

3. A removable sleeve and support assembly, a puller tool therefor, comprising:
  (a) a support housing including a cylindrical cavity and a bottom extending at least partially across the cavity,
  (b) an outwardly extending shaft positioned centrally of the cavity,
  (c) a removable sleeve frictionally held within the side walls of the cylindrical cavity of the support, the sleeve including internal threads, and
  (d) a puller tool for the removable sleeve, the tool being an elongated hollow tubular member having external threads arranged along one end only of the tool, and having an external diameter of sufficient size to allow the external threads to mate with the internal threads on the sleeve and having an internal diameter larger than the diameter of the shaft, whereby the tool is slidably engaged over the shaft and is guided by the shaft so as to bring the external and internal threads into working engagement.

References Cited

UNITED STATES PATENTS

| | | | |
|---|---|---|---|
| 1,802,012 | 4/1931 | Grebenstein | 29—264 |
| 1,818,626 | 8/1931 | Johnston | 29—264 X |
| 2,380,068 | 7/1945 | Patton | 29—280 X |
| 2,487,331 | 11/1949 | Greene | 29—281 X |
| 2,618,189 | 11/1952 | Almes | 29—271 X |
| 2,721,377 | 10/1955 | Hedlund | 29—264 |
| 3,030,702 | 4/1962 | Fowler | 29—280 |
| 3,104,460 | 9/1963 | Wight et al. | 308—187.1 X |
| 3,332,536 | 7/1967 | Ebly et al. | 29—264 |

FOREIGN PATENTS 237,589  8/1960  Australia.

MARTIN P. SCHWADRON, *Primary Examiner.*

F. SUSKO, *Assistant Examiner.*

U.S. Cl. X.R.

29—200, 201, 264, 281